United States Patent
Tulbah et al.

(10) Patent No.: US 11,938,564 B2
(45) Date of Patent: Mar. 26, 2024

(54) SYSTEMS AND METHODS FOR GENERATING PLASMA SHIELDS

(71) Applicant: Saudi Arabian Oil Company, Dhahran (SA)

(72) Inventors: Faris Hasan Tulbah, Al Khobar (SA); Rafael Adolfo Lastra Melo, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 280 days.

(21) Appl. No.: 17/229,296

(22) Filed: Apr. 13, 2021

(65) Prior Publication Data
US 2022/0324055 A1 Oct. 13, 2022

(51) Int. Cl.
*B23K 26/142* (2014.01)
*B23K 26/14* (2014.01)
(Continued)

(52) U.S. Cl.
CPC ........ *B23K 26/142* (2015.10); *B23K 26/1462* (2015.10); *H05H 1/341* (2013.01); *H05H 1/40* (2013.01)

(58) Field of Classification Search
CPC .............. B23K 26/142; B23K 26/1462; B23K 26/123; B23K 26/127; B23K 26/706; B23K 26/00; B23K 26/06; B23K 26/062; B23K 26/0622; B23K 26/0626; B23K 26/073; B23K 26/085; B23K 26/12; B23K 26/125;
(Continued)

(56) References Cited

U.S. PATENT DOCUMENTS

| 4,689,466 A | 8/1987 | Hoshinouchi et al. |
| 4,940,879 A * | 7/1990 | De-Swaan ......... B23Q 11/0064 |
| | | 219/121.72 |

(Continued)

FOREIGN PATENT DOCUMENTS

| CN | 205380361 U | 7/2016 |
| JP | H1034362 A * | 2/1998 |
| JP | 2004188451 A * | 7/2004 |

OTHER PUBLICATIONS

Bamford, R. et al., Shields for the starship Enterprise, A. G., 48:6.18-6.23 (2007).

(Continued)

*Primary Examiner* — Hung D Nguyen
(74) *Attorney, Agent, or Firm* — Osha Bergman Watanabe & Burton LLP

(57) ABSTRACT

This specification describes systems, methods, and architectures related to generating a plasma shield for laser operations. An example system for generating a plasma shield includes a laser head for directing a laser beam towards a target area on a workpiece. The path of the laser beam from the laser head to the target area on the workpiece is substantially surrounded by a plasma shield, which may form a gas-impermeable barrier. The plasma shield is configured to prevent the ingress of atmospheric or environmental gases, for example oxygen, into an area which would allow the gas to be in contact with the area of the workpiece being interacted with by a laser beam. The shape or location of the plasma shield may be controlled or altered using a magnetic field.

8 Claims, 3 Drawing Sheets

(51) Int. Cl.
*H05H 1/34* (2006.01)
*H05H 1/40* (2006.01)

(58) Field of Classification Search
CPC ........ B23K 26/126; H05H 1/341; H05H 1/40; H05H 1/02; H05H 1/03; H05H 1/04; H05H 1/24; H05H 1/30; H05H 1/34; H05H 1/46; H05H 1/4645; H05H 1/4652; H05H 1/50
See application file for complete search history.

(56) References Cited

U.S. PATENT DOCUMENTS

| | | | | |
|---|---|---|---|---|
| 5,015,818 A * | 5/1991 | Kautz | .................... | B23K 26/16 219/121.84 |
| 5,705,785 A | 1/1998 | Dykhno et al. | | |
| 5,770,098 A * | 6/1998 | Araki | ................ | H01L 21/31116 257/E21.252 |
| 6,528,948 B1 | 3/2003 | Hershcovitch et al. | | |
| 6,795,462 B1 * | 9/2004 | Christiansen | ............ | H05H 1/46 372/55 |
| 7,075,030 B2 | 7/2006 | Hershcovitch et al. | | |
| 2006/0043075 A1 * | 3/2006 | Hershcovitch | ......... | H05H 1/341 219/121.36 |
| 2013/0056672 A1 * | 3/2013 | Johnston | ................. | B29C 64/10 252/62.51 R |
| 2021/0137412 A1 * | 5/2021 | Sharma | .................... | A61B 5/05 |

OTHER PUBLICATIONS

Hershcovitch, A. I. et al., Plasma shield for in-air beam processes, Phys. Plasmas, 15:1-6 (2008).

Hershcovitch, A. I. et al., The Plasma Window: A Windowless High Pressure-Vacuum Interface for Various Accelerator Applications, Proceedings of the 1999 Particle Accelerator Conference, New York, 1-4 pages (1999).

Krasik, Y. E., et al., Plasma window characterization, Jrnl. App. Physics, 101:1-6 (2007).

International Search Report and Written Opinion of the International Searching Authority issued in corresponding International Application No. PCT/IB2021/053868, dated Apr. 29, 2022 (12 pages).

* cited by examiner

SYSTEMS AND METHODS FOR GENERATING PLASMA SHIELDS

TECHNICAL FIELD

This specification relates generally to systems and methods for generating a plasma shield for use in laser operations.

BACKGROUND

Safety during laser operations, such as when using a laser to cut a workpiece, is an important consideration. Yet, fires and other adverse safety incidents are not uncommon occurrences during laser operations. There are three elements required for creating fires—heat, fuel, and an oxidizing agent such as oxygen. When all three elements are present in an environment and combined, a fire may naturally occur. However, if access to or the presence of one element is limited or removed from the environment, the fire will cease or not occur at all.

During operations involving lasers, all three elements of the fire triangle may be present. For example, hot cuttings of a workpiece provide a heat source, a workpiece being cut or cuttings themselves may provide a fuel source, and oxygen in the atmosphere provides an oxidizing agent. This combination of elements may lead to the formation of a fire. Fires during laser usage are not desirable due to the safety issues that are presented. Furthermore, fires may damage the workpiece or systems performing the laser operation itself. Additionally, fires eject debris into the air, which would result in the power the laser delivers to a workpiece being attenuated as it passes through the airborne debris or particulates to the target. Accordingly, there exists a need for systems and methods for improved safety during laser operations.

SUMMARY

Presented in this specification are systems, methods, and architectures related to generating a plasma shield for laser operations. An example system for generating a plasma shield includes a laser head for directing a laser beam towards a target area on a workpiece. The path of the laser beam from the laser head to the target area on the workpiece is substantially surrounded by a plasma shield, which may form a gas-impermeable barrier. The plasma shield is configured to prevent the ingress of atmospheric or environmental gases, for example oxygen, into an area which would allow the gas to be in contact with the area of the workpiece being interacted with by a laser beam. The shape or location of the plasma shield may be controlled or altered using a magnetic field. The system may include one or more of the following features, either alone or in combination.

An example system is for use in laser operations. The system includes a laser head for directing a laser beam substantially towards a target area on a workpiece. The system includes a plasma generator for providing a plasma for creating a plasma shield. The plasma shield has a shape. The plasma shield substantially surrounds a path of the laser beam and the target area of the workpiece. The system also includes a magnetic system for generating a magnetic field. The magnetic field is configured to control or alter the shape or location, or both, of the plasma shield.

The provided plasma may be a cold (non-thermal) plasma.

The plasma shield may be substantially impermeable to a gas. The plasma shield may be a static plasma shield.

The laser head may include a fiber laser. The laser head may include optical components for focusing or collimating the laser beam. The laser head may comprise one or more target purging nozzles. The one or more target purging nozzles may eject an inert gas substantially towards the target area to remove debris from the path of the laser beam. The laser head may further include an air knife. The air knife may provide an inert gas for purging debris from the path of the laser beam.

The plasma generator may include a plasma discharge nozzle for ejecting plasma into the magnetic field. The plasma discharge nozzle may be fluidly connected to a plasma source.

The system may further include a control system comprising a processor of a computing device. The system may also include a memory, the memory storing instructions that, when executed by the processor, cause the processor to alter a location or a shape, or both, of the magnetic field using an artificial intelligence module. The instructions, when executed by the processor, may cause the processor to alter the location or shape, or both, of the magnetic field based on one or more factors of a surrounding environment.

The magnetic system may include one or more electromagnets. The one or more electromagnets may be movable to control or alter the shape of the magnetic field. The magnetic field may be a static magnetic field.

The workpiece may be comprised of or generate a flammable material.

An example method is for creating a plasma shield substantially surrounding a laser beam includes generating a laser beam and a magnetic field substantially around the laser beam and a target area of the workpiece. The method also includes injecting a plasma into the magnetic field. The method includes generating, using the injected plasma and the magnetic field, a plasma shield substantially around the laser beam and the target area.

The method may include generating a plasma that is a cold plasma.

The method may include generating a plasma shield that is substantially impermeable to gas.

The method may include purging a path of the laser beam of debris with a gas.

The method may include generating the laser beam using a fiber laser.

The method may include altering a location or a shape, or both, of the magnetic field based on one or more factors of a surrounding environment. The location or the shape of the magnetic field may be altered using a control system including an artificial intelligence module.

The method may include generating the magnetic field using one or more electromagnets. The one or more electromagnets may be moved to alter a location or a shape, or both, of the magnetic field. The method may include generating a static magnetic field.

The plasma shield may be a static plasma shield.

The workpiece may be comprised of or generate a flammable material.

The details of one or more implementations are set forth in the accompanying drawings and the description. Other features and advantages will be apparent from the description and drawings, and from the claims.

BRIEF DESCRIPTION OF THE FIGURES

The foregoing and other objects, aspects, features, and advantages of the present disclosure will become more apparent and better understood by referring to the following description taken in conjunction with the accompanying drawings, in which.

Like reference numerals in the figures indicate like elements.

DEFINITIONS

Figure 1:
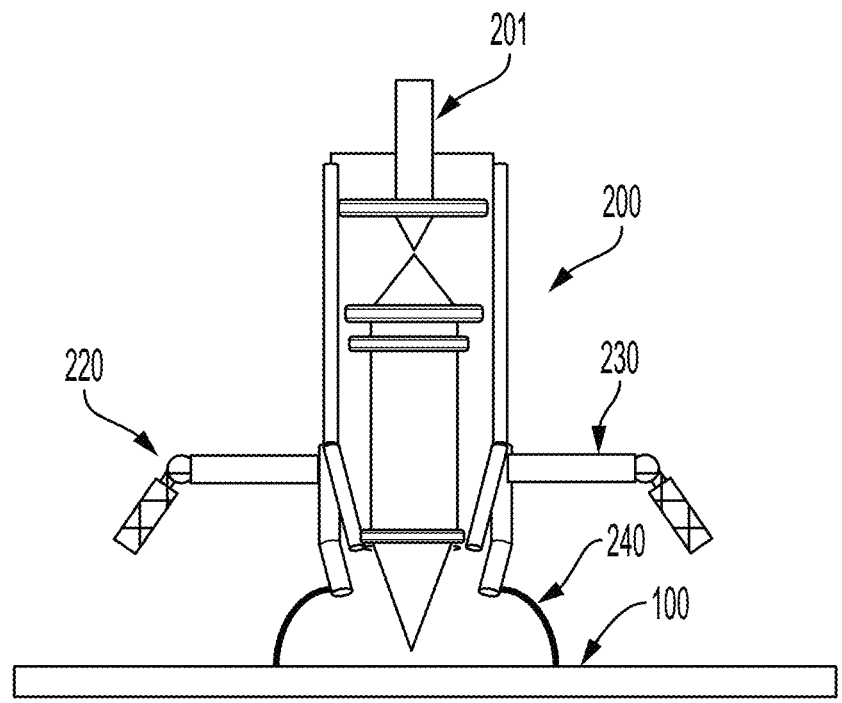
FIG. 1 is a cross-sectional view of an example laser system used in laser operations.

About: The term "about", when used herein in reference to a value, refers to a value that is similar, in context, to the referenced value. In general, those skilled in the art, familiar with the context, will appreciate the relevant degree of variance encompassed by "about" in that context. For example, in some embodiments, the term "about" can encompass a range of values that within 25%, 20%, 19%, 18%, 17%, 16%, 15%, 14%, 13%, 12%, 11%, 10%, 9%, 8%, 7%, 6%, 5%, 4%, 3%, 2%, 1%, or with a fraction of a percent, of the referred value.

DETAILED DESCRIPTION

As is discussed in this specification, laser usage on materials may result in adverse safety incidents, such as fires. For example, all three elements required to produce a fire, that is, oxygen, heat, and fuel (a so-called "fire triangle"), may be present during laser operations. Conditions required to create a fire may be met when hot fragments of a workpiece being cut during laser cutting operations provides a heat source, a workpiece being cut provides a fuel source, and oxygen in the air provides an oxidizing agent. During laser operations, fires may, among other things, present significant safety concerns for users, damage equipment used to perform laser operations, damage a workpiece, or reduce a laser's effectiveness through the presence of debris in a path of the laser. Debris includes, but is not limited to, particulate matter, airborne particulates such as smoke, and other materials found in a path of a laser beam due to a laser operation or due to the operating environment of the laser. Accordingly, means to prevent fires and remove debris from a path of a laser during laser operations would improve safety and other related features of laser operations.

This specification describes examples of technologies used in laser operations, which may be used to prevent fires and issues associated with fires or debris in a path of a laser. Laser operations are those processes and methods that use lasers to modify one or more workpieces. Examples of laser operations include, but are not limited to, laser cladding, laser welding, laser cutting, laser drilling, melting, cleaning, laser marking, laser machining, and laser printing. Examples of laser printing include, but are not limited to, stereolithography 3D printing, photolithography, and the like. Objects or materials being worked on by a laser operation may be referred to as a workpiece.

As described in this specification, the technologies may be used "disable" the fire triangle by reducing the presence of or eliminating one or more components of the fire triangle. These technologies employ plasma as a shield around a portion of the workpiece as a means to reduce or eliminate elements of the fire triangle during laser operations. Plasma may be used to form a gas-impermeable barrier (a "plasma shield") substantially around a laser's path and a target area in order to prevent ingress of oxygen into the laser path and target area. The lack of oxygen due to the plasma shield inhibits fire formation.

Generating plasma may be done artificially through various methods and techniques apparent to those of skill in the art from the descriptions provided in this specification. Methods used to form plasma influences properties of the plasma. For example, hot or "thermal" plasmas may be generated by heating gases to extremely high temperatures, which allow the electrons in the gas to escape and make the gas ionized. Cold or "non-thermal" plasmas may be generated by pumping electrons at a high speed into a gas at ambient conditions. Gases used to create cold plasmas may include noble gases, ambient air, or aqueous vapors. Example noble gases that may be used in forming cold plasmas include, but are not limited to, helium, argon, neon, and xenon. Mixtures of gases may also be used depending on the application and desired properties of the plasma. Techniques for creating cold plasma knock out the valence electrons of the gas out of orbit to create an ionized gas.

Cold plasmas are significantly safer than hot plasmas due to their thermal properties. Hot plasmas are used in technologies such as fusion energy development projects. When hot plasmas are generated, the molecules are in thermal equilibrium with one another, which results in very high temperatures—thermal plasmas maintain temperatures from about 10,000° C. to about 100,000° C. The very high temperatures make hot plasmas unsuitable for laser operations discussed in this specification because high temperatures of the plasma will impart significant amounts of heat into a workpiece. As compared to hot plasmas, cold plasmas are generally regarded to have much lower temperatures. Only a fraction of the gases used in cold plasmas are ionized—about 1% or less. As a result, cold plasmas generated by methods described in this specification generally maintain temperatures of about 25° C. to about 400° C. Temperatures of cold plasma depends on a number of factors including the configuration of the plasma generator and the type and composition of gases used. Accordingly, in certain embodiments, technologies described in this specification may be configured to use cold plasmas due to their ability to be formed and safely used under ambient conditions.

Moreover, ionized gases which compose plasma react strongly to external magnetic fields, such as those created by, for example, electromagnets or permanent magnets. The reactivity of plasma to magnetic fields allows for a user to manipulate one or more of the shape, location, density, viscosity, and movement of plasma. The shape of a plasma or plasma shield as described in this specification is the volume which the plasma or plasma shield occupies in three dimensional (3D) space. The shape, movement, and location of the plasma or plasma shield may be manipulated or modulated by altering properties of magnetic field with which the plasma interacts. For example, parameters of the magnetic field that may be used to alter the shape of plasma or the plasma shield include, but are not limited to, the strength or intensity of the magnetic field, a position of one or more components used to produce the magnetic field, and the directionality of the magnetic field. In certain embodiments, an electromagnetic field may be used to manipulate plasma in the same or similar manner to a (permanent) magnetic field. It would be understood by those of skill in the art that an electromagnetic field includes aspects of (permanent) magnetic fields. In certain embodiments, the density of plasma may be altered using one or more properties of a magnetic field. For example, increasing the strength or intensity of a magnetic field may result in an increased density of plasma. In some embodiments, one or more parameters of the plasma shield may be adjusted, modulating one or more gas parameters, for example, gas composition, gas pressure, gas temperature or gas density.

Technology as described in this specification may be used to create a magnetic field that does not vary significantly with time. In certain embodiments, a magnetic field used to manipulate plasma is a directional magnetic field, which substantially maintains a constant direction and strength or intensity over time. Such a magnetic field may be referred to as a static magnetic field. In a static magnetic field, a shape and location of a plasma or a plasma shield manipulated by the magnetic field does not appreciably change over time. In certain instances, this type of plasma shield may be referred to as a static plasma shield. A static magnetic field may be created using, for example, electromagnets using direct current (DC) or permanent magnets. A static magnetic field differs from a dynamic magnetic field in that a dynamic magnetic field rapidly changes with time. For example, dynamic or time-varying magnetic fields may alter their directionality using alternating current (AC).

As discussed in this specification, plasma may be made impermeable to gases, such as atmospheric gases, due to its unique properties. For example, if plasma is sufficiently viscous, it will form a physical barrier or "plasma shield" to prevent gases and other matter from being able to pass through it. Prevention of particular gases, for example oxygen, from being present in an environment in which a laser beam is interacting with a workpiece particularly advantageous. As described in this specification, not only does limiting or removal of oxygen from the environment enhance safety by preventing fires, it also inhibits undesirable chemical reactions from occurring at a target area with other gases or particulate matter in the environment. For example, when performing laser welding operations, oxidation of a workpiece made of metal may occur when welding under atmospheric conditions. Preventing the ingress of oxygen would limit metal oxidation and may improve welds. Accordingly, controlling the environment in which laser operations take place in may lead to more predictable and desirable results.

Integrity of a plasma shield is important for maintaining a barrier between an environment and the immediate area in which laser operations are occurring. If the pressure, concentration, or density of plasma is sufficiently high, it will prevent the plasma shield from breaking apart due to, for example, external pressures. Cold plasmas may have a pressure similar to atmospheric pressure. Moreover, plasma has the property of being able to remove oxygen and other like gases due to the plasma's high speed molecules. The plasma's high speed molecules move too fast for the slower moving air molecules, and prevent the air molecules from passing through the plasma shield. In addition, heat or temperature may be used to alter the viscosity, density, or both of plasma. Plasmas tend to become increasingly viscous when they are heated. In some implementations, plasma temperature is raised from an initial temperature in order to increase plasma density.

A plasma shield may be located or positioned substantially surrounding a path of a laser beam to a workpiece, extending from a laser head to a target area on the workpiece. An example laser head (200) positioned over an example workpiece (100) is shown in FIG. 1. The distance between the laser head and workpiece over which a plasma shield (240) extends may be less than 5 cm, 2 cm, 1 cm, or less. A plasma shield (240) may be manipulated or modulated by altering properties of magnetic field generated by a magnetic system (220) including a magnetic field generator. As the laser head moves across the surface of the workpiece, the location, shape, plasma concentration, plasma density, and movement of the plasma shield (240) may be adjusted accordingly in order to ensure a plasma shield is maintained in a target area and around a path of the laser beam (201).

Figure 2:
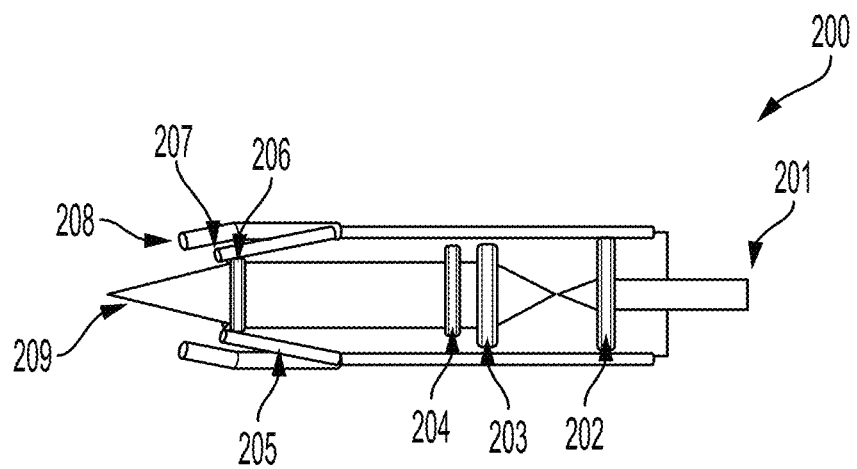
FIG. 2 is a cross-sectional view of an example laser head used in laser operations.

In some implementations, technologies disclosed in this specification include a laser head (200) designed for laser operations, for example, laser cutting or laser welding. The laser head is configured to deliver a laser beam (201) to a target area on a workpiece (100). A cross-section of an example laser head (200) is presented in FIG. 2. In this example, the laser head (200) directs a laser beam (201) to a target area on a workpiece. As shown in FIG. 2, the laser beam (201) is a "raw" beam, meaning that the laser beam has not yet been modified by an optical component in the laser head (200). In certain embodiments, the laser beam (201) may be modified by one or more optical components prior to entering the laser head (200).

The systems and technologies used for generation of a laser beam would be understood by those of skill in the art based on the descriptions provided in this specification. In certain embodiments, a laser beam (201) may be generated by fiber lasers. Fiber lasers are lasers where the active gain medium is an optical fiber doped with rare earth elements. Example rare earth elements include, but are not limited to, erbium, ytterbium, neodymium, dysprosium, praseodymium, thulium, and holmium. In certain embodiments, a fiber optic cable may conduct a laser beam (201) to a laser head (200). A fiber optic cable may include a single fiber optic strand, multiple fiber optic strands, or multiple fiber optic cables. Systems as described in this specification may include a laser generator (not shown). A laser generator is configured to generate a laser beam (201) and to output the laser beam to the laser head (200). The laser beam output by the laser generator is referred to as a "raw" laser beam because it has not been manipulated by optical components of a laser head. Examples of laser generators include ytterbium lasers, erbium lasers, neodymium lasers, dysprosium lasers, praseodymium lasers, and thulium lasers.

In some implementations, a laser generator can be configured to output laser beams having different energy densities. Laser beams having different energy densities may be useful for workpieces that have different material properties or for use in different applications.

In certain embodiments, a laser beam (201) may pass through one or more optical components in a laser head (200). One or more optical components may be configured to alter one or more properties of a raw laser beam (201). For example, an optical component, such as a focusing lens (202) and collimation lens (203), may be placed at distance from one another to manipulate and reshape a laser beam based on one or more requirements of the application of the laser operation. Modifications to the arrangement, number, or types of optical components along a path of a laser beam (201) would be understood by those of skill in the art based on the descriptions provided in this specification.

In addition, optical components in a laser head may be protected from debris by one or more cover lenses (204, 206). In certain embodiments, a cover lens (204, 206) is configured to allow a laser beam (201) to pass through without modifying properties of the laser beam (201). In certain embodiments as depicted in FIG. 2, a cover lens (206) is placed where a laser beam (201) exits a laser head (200). In this arrangement, a cover lens (206) may be used to isolate and seal optical components of a laser head (200). The cover lens (206) protects optical components of the laser head (200) by preventing debris in the environment or produced by a laser operation from getting into or onto optical components within a laser head (200). In particular, a cover lens (206) may prevent fumes from entering into the laser head (200). Fumes may be generated from an interaction between a laser beam (201) and a workpiece (100). While a workpiece itself may not be flammable, the workpiece may generate fumes or debris. For example, a workpiece may generate flammable material through an interaction with a workpiece with a laser beam or through an interaction between a workpiece and its surrounding environment.

The technology described in this specification can include one or more air knives and one or more nozzles, such as purging nozzles (205) and vacuum nozzles (not shown). Air knives (207), purging nozzles (205), and vacuum nozzles may be configured to operate together to reduce or to eliminate debris or fumes in the path of a collimated laser beam (209). Debris or fumes in the path of the laser beam (209) may disrupt, bend, or scatter the laser beam. In certain implementations, debris or fumes in an environment or produced by a laser process may be flammable. In certain embodiments, a laser head (200) has one or more target purging nozzles (205) or one or more air knives (207) configured to clear a path of the laser beam (209) from the laser head (200) to a target area on a workpiece (100). Target purging nozzles and air knives clear a path of a laser beam of debris, fumes, or both by discharging or ejecting a purging medium on or near a laser head. The choice of purging media to use may be based on the application of the laser operation. In some implementations, the purging media can be, or include, a non-reactive, non-damaging gas such as nitrogen. An important property of the purging media is that it will not cause a fire or provide an oxidizing agent, for example oxygen, when introduced into an environment around a target area. In some implementations, purging may be cyclical. For example, purging may occur while the laser beam or plasma, or both, are on.

An air knife (207) is configured to sweep debris or fumes from an optical component, for example, a cover lens (206). In some implementations, an air knife (207) is proximate to where a laser beam exits a laser head (200) and is configured to discharge a gas onto, or across, a surface of a cover lens (206). Examples of gas that may be used include a non-reactive, non-damaging gas such as nitrogen. In some implementations, the combined operation of air knives (207) and purging nozzles (205) can create an unobstructed path for transmission of a laser beam (209) from a laser head to a target area on a workpiece. In some implementations, air knives (207) and purging nozzles (205) can work in combination with vacuum nozzles, where the vacuum nozzles aspirate gas, for example, purging media, from a surface of a cover lens or a space adjacent to the surface of the cover lens.

A laser head may be configured to include one or more components that discharge or inject plasma into a magnetic field. As is described in this specification, plasma injected into a magnetic field may be a cold or non-thermal plasma. A plasma generator (not shown) may be configured to eject plasma into a magnetic field using one or more plasma discharge nozzles (208).

Methods and technologies suitable for use in creating plasmas will be clear to one of skill in the art from the descriptions provided in this specification. For example, plasma may be produced, either via electromagnetic pumping or by having an electron-beam device equipped with a laser, to concurrently produce plasma during laser operation. The electron-beam device may produce cold plasma by shooting electrons at a gas (a "discharge" or "carrier" gas). Example carrier gases include, but are not limited to, inert gases such as helium, argon, neon, xenon, or mixtures thereof. However, other gases may be used depending on the laser operation being conducted.

Other methods of producing plasmas that may be used include configurations described in this specification are known as "plasma jets" and "plasma needles". In an example plasma jet, a carrier gas is flowed through an insulated segment of tubing. The insulated tubing segment may be made of a material that is not electrically conductive. Example non-conductive materials include materials such as quartz, glass, and non-conductive ceramics. A power supply may be configured to create an electric field within the tube to ionize a carrier gas and form a plasma in the insulated tube. For example, a plasma jet may be created using a high voltage (greater than 100 Volts) power supply. The power supply may be configured to have a frequency of about 500 Hz to 100 kHz. The plasma produced using the carrier gas may then be delivered by a plasma discharge nozzle (208) to an area proximal to a laser head (200) for use in generating a plasma shield.

The plasma discharge nozzle (208) may be fluidly connected to a plasma generator, which is configured to generate and deliver plasma to the laser head (200). In certain embodiments, a plasma generator may be configured to be or include a portable source of plasma. For example, a portable supply of a carrier gas may be provided. In certain embodiments, plasma is supplied to a plasma discharge nozzle (208) by a fluid path (not shown) extending from a plasma generator to a plasma discharge nozzle (208).

Plasma nozzles serve to concentrate plasma in close proximity to a final laser beam (209) in order to generate a plasma shield substantially around a path of a laser beam (209) as it exits the laser head (200) (for example, within 1 millimeter (mm), 2 mm, 5 mm, 10 mm, 20 mm, or 50 mm in each direction from the focal point of the laser on the workpiece). A plasma shield (240) may enclose a volume of about 1 $mm^3$, 5 $mm^3$, 10 $mm^3$, 50 $mm^3$, 100 $mm^3$, 500 $mm^3$, 1000 $mm^3$, or more. In certain embodiments, a plasma discharge nozzle may be configured as an annular ring circumscribing the final laser beam (209). As in, the plasma discharge nozzle (208) is configured such that plasma is emitted around a final laser beam (209) as the laser beam exits the laser head (200). In certain embodiments, a plasma discharge nozzle (208) may be placed proximal to a point on a laser head (200) at which the final laser beam (209) exits the laser head (200).

The technologies described in this specification use a magnetic system (400) including a magnetic field generator that can form magnetic or electromagnetic fields to encapsulate or contain plasmas substantially around a path of a laser, thus forming a "plasma shield" as described in this specification. A magnetic system as described in this specification may be configured with one or more electromagnets in order to control one or more properties of the magnetic fields. Properties of magnetic fields include, but are not limited to, shape, strength or intensity, frequency, and directionality of the field. In certain embodiments, the strength of magnetic fields used to encapsulate, contain, or otherwise manipulate or modulate plasmas of the plasma shield may be at least 2 Tesla, 10 Tesla, 20 Tesla, 30 Tesla, 40 Tesla, 50 Tesla or more.

In some embodiments, a magnetic system (220) or components thereof may be powered by electric power received from a power grid. In some embodiments, a magnetic system or components thereof may be powered by one or more batteries (230). The use of batteries may allow for components of the magnetic system (220) to be configured to be portable or separable from a laser head. For example, a magnetic system used for controlling or adjusting a magnetic field may be positioned separately. In addition or alternatively, a magnetic system (220) may electrically isolated from a laser head using batteries (230). In addition or alternatively, batteries (230) may be used to provide a stable source of electric power. For example, when electric power supplied from a power grid is inconsistent or unstable, batteries may be used in addition to or as an alternative to power supplied from a power grid. Batteries may provide a stable source of power to prevent a laser operation from being interrupted through loss of power or inconsistent power.

One or more components of the magnetic system (220) may be repositioned in order to alter one or more properties of the magnetic field. For example, one or more magnets, for example, electromagnets, can be physically repositioned to ensure full enclosure of a laser beam path or cutting area, or both, with a plasma shield. Physical repositioning of one or more magnets, for example, electromagnets may be used either alone or in conjunction with other features of a magnetic system (220) in order to obtain a desired shape and location of the plasma shield. Alternatively or additionally, parameters of the magnetic system may be used to adjust or maintain a static magnetic field as described herein. A static magnetic field may be used to create a static plasma shield. In laser operations as described in this specification, it may be particularly useful and advantageous to maintain a static magnetic field for plasma shields. Static magnetic fields may be advantageous as they are regarded to be more stable and easier to control than dynamic fields.

A magnetic system (220) may use a control system (not shown), for example, an electronic control system, to control the location and shape of the magnetic field. For example, a control system may be used to adjust one or more properties of the magnetic field such as the shape, location, strength or intensity, and directionality in order to change properties of a plasma shield as described in this specification, including, but not limited to, the location, density, concentration, and shape of the plasma shield. A control system may take into account one or more factors regarding the target area of the workpiece, laser beam, and surrounding environment in order to alter the shape of the magnetic field and, subsequently, the plasma shield. In addition or alternatively, a control system may be used to adjust one or more parameters regarding plasma generated and discharged into a plasma field. For example, a control system may adjust a velocity or pressure of gas or plasma being flowed through a plasma discharge nozzle (208), a mixture of gases being flowed through a plasma discharge nozzle (208), a voltage or frequency of a power supply used to generate a plasma, or any combination thereof.

A control system may utilize an artificial intelligence module to alter a magnetic field or a plasma shield. For example, based on one or more environmental factors provided to or determined by the control system properties of the magnetic field or plasma shield may be changed to ensure a path of a laser beam and a target on a workpiece are substantially enclosed by the plasma shield. As described in this specification, properties of the plasma shield that may be changed include, but are not limited to, shape, gas composition, pressure, location, concentration, and density of the plasma shield. As described in this specification, properties of the magnetic field that may be changed include, but are not limited to the intensity, frequency, directionality, shape, and location of the magnetic field. As would be understood by one of skill in the art based on the description provided, an artificial intelligence module may be trained using one or more inputs descriptive of environmental factors in which a laser operation takes place. Inputs that may be used by the artificial intelligence to alter or change the magnetic field include, but are not limited to, inputs from one or more sensors in an environment where laser operations are conducted or inputs from a user. For example, if the control system were to determine a change in position of a target area or a workpiece during a laser operation, the control system may, using the artificial intelligence module, alter the magnetic field to change the location and position of the plasma shield substantially surrounding the path of the laser beam. In another example, the control system may alter one or more parameters of plasma generated for a plasma shield to adjust for a changing distance between a workpiece and a laser head.

A control system may be used to make efficient usage of resources. In laser operations, resources may be constrained either by cost or availability of a resource. Examples of resources used in a laser operation include, but are not limited to, plasma supply, electrical power, plasma gas, and other consumable resources as discussed in this specification. Additionally or alternatively, particular actions performed during a laser operation may have a high cost compared to other means for performing similar functions. In the context of artificial intelligence and machine learning, cost may not exclusively refer to a monetary cost, but a penalty assigned to an action or series of actions. Costs may be used to encourage or deter an action. A control system may use artificial intelligence and machine learning to minimize a cost function of a laser operation based on one or more inputs and costs associated with the inputs.

In certain implementations, a machine learning algorithm employed by artificial intelligence may be trained using one or more parameters related to resource utilization. For example, a machine learning algorithm may be trained using one or more inputs such as properties of process materials, an estimated time to complete a process or an estimate amount of resources. A machine learning algorithm may be used to minimize a cost function related to a price of a product, price of one or more resources, or time in order to meet operational or production criteria. Production criteria may include a price of a process or quality of a product. For example, more time spent on a piece may result in a tight part or cut tolerance by moving a laser head at a slower rate. However, additional time spent on a piece may also result in use of additional resources, such as plasma and electrical power. In certain embodiments, artificial intelligence may use a machine learning algorithm keep a cost per process below an estimated threshold value by altering one or more parameters related to resource utilization.

A control system may monitor temperature of a workpiece using one or more sensors. Keeping temperature of a workpiece within a temperature range or below a threshold temperature may avoid adverse events. For example, if a workpiece exceeds a critical temperature, the workpiece may melt, warp, or generate fumes or debris. A control system may alter one or more properties of a laser, one or more properties of a plasma shield, one or more properties of a magnetic field, or a combination of all three in order to maintain the temperature of a workpiece within or below a desired range. Alternatively or additionally, a control system may use artificial intelligence and machine learning to maintain a temperature of a workpiece within or below a desired temperature range.

Figure 3:
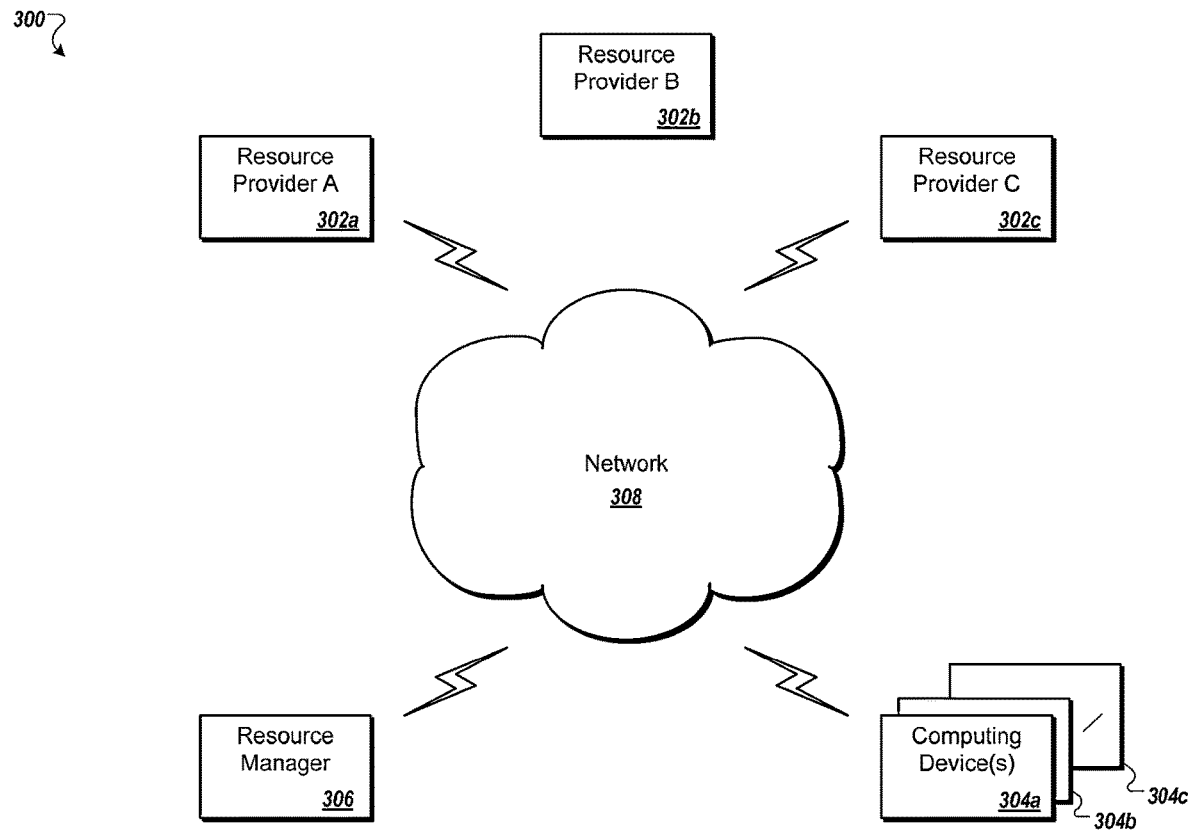
FIG. 3 is a block diagram of an example cloud computing environment, used in certain embodiments.

As shown in FIG. 3, an implementation of a network environment (300) may be configured to control systems for technology shown and described in this specification. In brief overview, referring now to FIG. 3, a block diagram of an example cloud computing environment (300) is shown and described. The cloud computing environment (300) may include one or more resource providers 302a, 302b, 302c (collectively, 302). Each resource provider (302) may include computing resources. In some implementations, computing resources may include any hardware and/or software used to process data. For example, computing resources may include hardware and/or software capable of executing algorithms, computer programs, and/or computer applications. In some implementations, example computing resources may include application servers and/or databases with storage and retrieval capabilities. Each resource provider (302) may be connected to any other resource provider (302) in the cloud computing environment (300). In some implementations, the resource providers (302 may be connected over a computer network (308). Each resource provider (302) may be connected to one or more computing devices (304a, 304b, 304c) (collectively, 304), over the computer network (308).

The cloud computing environment (300) may include a resource manager (306). The resource manager (306) may be connected to the resource providers (302) and the computing devices (304) over the computer network (308). In some implementations, the resource manager (306) may facilitate the provision of computing resources by one or more resource providers (302) to one or more computing devices (304). The resource manager (306) may receive a request for a computing resource from a particular computing device (304). The resource manager (306) may identify one or more resource providers (302) capable of providing the computing resource requested by the computing device (304). The resource manager (306) may select a resource provider (302) to provide the computing resource. The resource manager (306) may facilitate a connection between the resource provider (302) and a particular computing device (304). In some implementations, the resource manager (306) may establish a connection between a particular resource provider (302) and a particular computing device (304). In some implementations, the resource manager (306) may redirect a particular computing device (304) to a particular resource provider (302) with the requested computing resource.

Figure 4:
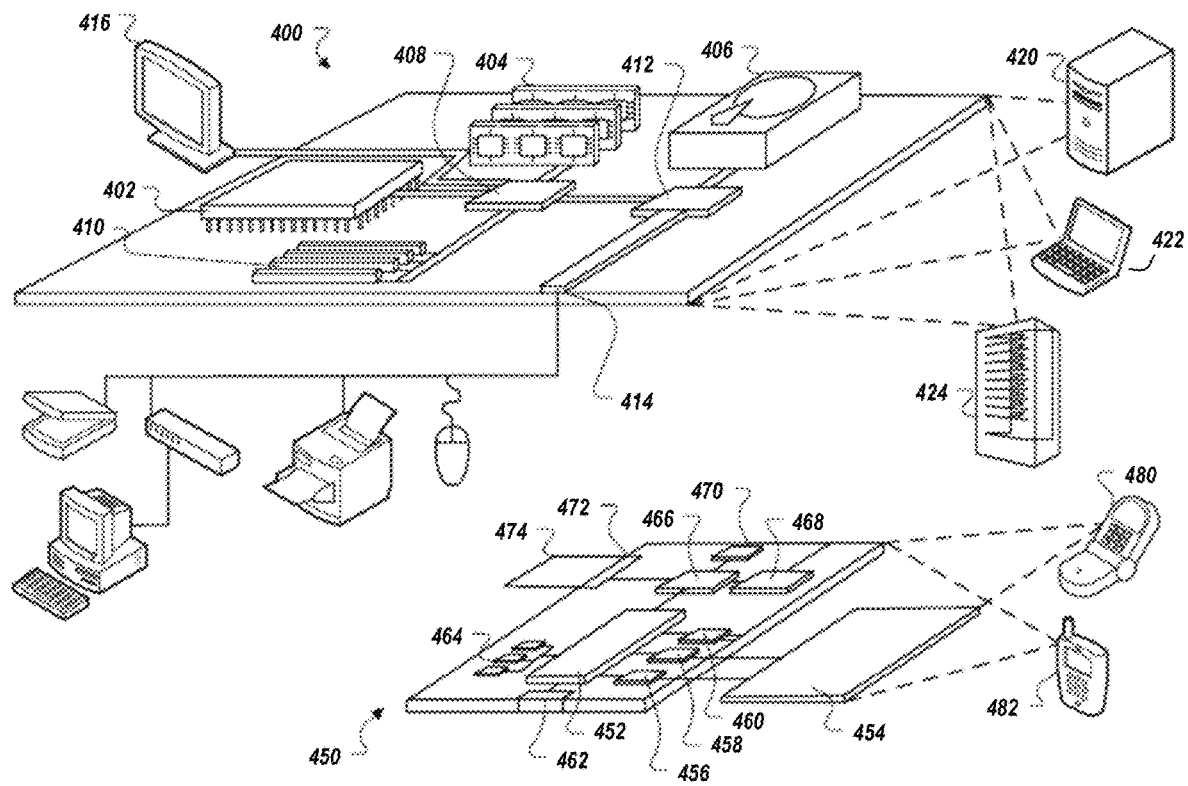
FIG. 4 is a block diagram of an example computing device and an example mobile computing device used in certain embodiments.

FIG. 4 shows an example of a computing device (400) and a mobile computing device (450) that can be used to implement the techniques described in this specification. The computing device (400) is intended to represent various forms of digital computers, such as laptops, desktops, workstations, personal digital assistants, servers, blade servers, mainframes, and other appropriate computers. The mobile computing device (450) is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device (400) includes a processor (402), a memory (404), a storage device (406), a high-speed interface (408) connecting to the memory (404) and multiple high-speed expansion ports (410), and a low-speed interface (412) connecting to a low-speed expansion port (414) and the storage device (406). Each of the processor (402), the memory (404), the storage device (406), the high-speed interface (408), the high-speed expansion ports (410), and the low-speed interface (412), are interconnected using various busses, and may be mounted on a common motherboard or in other manners as appropriate. The processor (402) can process instructions for execution within the computing device (400), including instructions stored in the memory (404) or on the storage device (406) to display graphical information for a GUI on an external input/output device, such as a display (416) coupled to the high-speed interface (408). In other implementations, multiple processors or multiple buses, or both, may be used, as appropriate, along with multiple memories and types of memory. Also, multiple computing devices may be connected, with each device providing portions of the necessary operations For example, multiple computing devices may be connected as a server bank, a group of blade servers, or a multi-processor system. Thus, as the term is used in this specification, where a plurality of functions are described as being performed by "a processor", this encompasses embodiments wherein the plurality of functions are performed by any number of processors (one or more) of any number of computing devices (one or more). Furthermore, where a function is described as being performed by "a processor", this encompasses embodiments wherein the function is performed by any number of processors (one or more) of any number of computing devices (one or more), for example, as in a distributed computing system.

The memory (404) stores information within the computing device (400). In some implementations, the memory (404) is a volatile memory unit or units. In some implementations, the memory (404) is a non-volatile memory unit or units. The memory (404) may also be another form of computer-readable medium, such as a magnetic or optical disk.

The storage device (406) is capable of providing mass storage for the computing device (400). In some implementations, the storage device (406) may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface (408) manages bandwidth-intensive operations for the computing device (400), while the low-speed interface (412) manages lower bandwidth-intensive operations. Such allocation of functions is an example only. In some implementations, the high-speed interface (408) is coupled to the memory (404), the display (416) (for example, through a graphics processor or accelerator), and to the high-speed expansion ports (410), which may accept various expansion cards (not shown). In the implementation, the low-speed interface (412) is coupled to the storage device (406) and the low-speed expansion port (414). The low-speed expansion port (414), which may include various communication ports. Examples of communication ports include USB (Universal Serial Bus), Bluetooth®, Ethernet, wireless Ethernet. The communication ports may be coupled to one or more input/output devices, such as a keyboard (for example, an Arabic keyboard), a pointing device, a scanner, or a networking device such as a switch or router, for example, through a network adapter.

The computing device (400) may be implemented in a number of different forms, as shown in the figure. For example, it may be implemented as a standard server (420), or multiple times in a group of such servers. In addition, it may be implemented in a personal computer such as a laptop computer (422). It may also be implemented as part of a rack server system (424). Alternatively, components from the computing device (400) may be combined with other components in a mobile device (not shown), such as a mobile computing device (450). Each of such devices may contain one or more of the computing device (400) and the mobile computing device (450), and an entire system may be made up of multiple computing devices communicating with each other.

The mobile computing device (450) includes a processor (452), a memory (464), an input/output device such as a display (454), a communication interface (466), and a transceiver (468), among other components. The mobile computing device (450 may also be provided with a storage device, such as a micro-drive or other device, to provide additional storage. Each of the processor (452), the memory (464), the display (454), the communication interface (466), and the transceiver (468), are interconnected using various buses, and several of the components may be mounted on a common motherboard or in other manners as appropriate.

The processor (452) can execute instructions within the mobile computing device (450), including instructions stored in the memory (464). The processor (452) may be implemented as a chipset of chips that include separate and multiple analog and digital processors. The processor (452) may provide, for example, for coordination of the other components of the mobile computing device (450), such as control of user interfaces, applications run by the mobile computing device (450), and wireless communication by the mobile computing device (450).

The processor (452) may communicate with a user through a control interface (458) and a display interface (456) coupled to the display (454). The display (454) may be, for example, a TFT (Thin-Film-Transistor Liquid Crystal Display) display or an OLED (Organic Light Emitting Diode) display, or other appropriate display technology. The display interface (456) may comprise appropriate circuitry for driving the display (454) to present graphical and other information to a user. The control interface (458) may receive commands from a user and convert them for submission to the processor (452). In addition, an external interface (462) may provide communication with the processor (452), so as to enable near area communication of the mobile computing device (450) with other devices. The external interface (462) may provide, for example, for wired communication in some implementations, or for wireless communication in other implementations, and multiple interfaces may also be used.

The memory (464) stores information within the mobile computing device (450). The memory (464) can be implemented as one or more of a computer-readable medium or media, a volatile memory unit or units, or a non-volatile memory unit or units. An expansion memory (474) may also be provided and connected to the mobile computing device (450) through an expansion interface (472), which may include, for example, a SIMM (Single In Line Memory Module) card interface. The expansion memory (474) may provide extra storage space for the mobile computing device (450), or may also store applications or other information for the mobile computing device (450). Specifically, the expansion memory (474) may include instructions to carry out or supplement the processes described above, and may include secure information also. Thus, for example, the expansion memory (474) may be provide as a security module for the mobile computing device (450), and may be programmed with instructions that permit secure use of the mobile computing device (450). In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 452), may perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver (468) or the external interface (462).

The mobile computing device (450) may communicate wirelessly through the communication interface (466), which may include digital signal processing circuitry where necessary. The communication interface (466) may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000 (Code Division Multiple Access 2000), or GPRS (General Packet Radio Service), among others. Such communication may occur, for example, through the transceiver (468) using a radio-frequency. In addition, short-range communication may occur, such as using a Bluetooth®, Wi-Fi™, or other such transceiver (not shown). In addition, a GPS (Global Positioning System) receiver module (470) may provide additional navigation- and location-related wireless data to the mobile computing device (450), which may be used as appropriate by applications running on the mobile computing device (450).

The mobile computing device (450) may also communicate audibly using an audio codec (460), which may receive spoken information from a user and convert it to usable digital information. The audio codec (460) may likewise generate audible sound for a user, such as through a speaker, for example, in a handset of the mobile computing device (450). Such sound may include sound from voice telephone calls, may include recorded sound (for example, voice messages, music files, or the like) and may also include sound generated by applications operating on the mobile computing device (450).

The mobile computing device (450) may be implemented in a number of different forms, as shown in the figure. For example, it may be implemented as a cellular telephone (480). It may also be implemented as part of a smart-phone (482), personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (for example, magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (for example, a CRT (cathode ray tube) or LCD (liquid crystal display) monitor) for displaying information to the user and a keyboard and a pointing device (for example, a mouse or a trackball) by which the user can provide input to the computer. Other kinds of devices can be used to provide for interaction with a user as well; for example, feedback provided to the user can be any form of sensory feedback (for example, visual feedback, auditory feedback, or tactile feedback); and input from the user can be received in any form, including acoustic, speech, or tactile input.

The systems and techniques described here can be implemented in a computing system that includes a back end component (for example, as a data server), or that includes a middleware component (for example, an application server), or that includes a front end component (for example, a client computer having a graphical user interface or a Web browser through which a user can interact with an implementation of the systems and techniques described here), or any combination of such back end, middleware, or front end components. The components of the system can be interconnected by any form or medium of digital data communication (for example, a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the modules (for example, data aggregation module, mapping module, specifications module) described herein can be separated, combined or incorporated into single or combined modules. The modules depicted in the figures are not intended to limit the systems described herein to the software architectures shown therein.

Elements of different implementations described herein may be combined to form other implementations not specifically set forth above. Elements may be left out of the processes, computer programs, databases, etc. described herein without adversely affecting their operation. In addition, the logic flows depicted in the figures do not require the particular order shown, or sequential order, to achieve desirable results. Various separate elements may be combined into one or more individual elements to perform the functions described herein.

Throughout the description, where apparatus and systems are described as having, including, or comprising specific components, or where processes and methods are described as having, including, or comprising specific steps, it is contemplated that, additionally, there are apparatus, and systems of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

While the invention has been particularly shown and described with reference to specific preferred embodiments, it should be understood by those skilled in the art that various changes in form and detail may be made therein without departing from the spirit and scope of the invention as defined by the appended claims.

It is contemplated that systems, architectures, devices, methods, and processes of the claimed invention encompass variations and adaptations developed using information from the embodiments described herein. Adaptation, modification, or both of the systems, architectures, devices, methods, and processes described herein may be performed, as contemplated by this description.

Throughout the description, where articles, devices, systems, and architectures are described as having, including, or comprising specific components, or where processes and methods are described as having, including, or comprising specific steps, it is contemplated that, additionally, there are articles, devices, systems, and architectures of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

The Background section is presented for purposes of clarity and is not meant as a description of prior art with respect to any claim.

Headers are provided for the convenience of the reader—the presence or placement of a header is not intended to limit the scope of the subject matter described herein.

What is claimed is:

1. A method for creating a plasma shield surrounding a laser beam configured to modify a characteristic of a workpiece, the method comprising:
- generating the laser beam, wherein the laser beam is configured to modify the characteristic of the workpiece;
- generating a magnetic field around the laser beam and a target area of the workpiece;
- injecting a plasma into the magnetic field;
- altering a location or a shape, or both, of the magnetic field based on a surrounding environment using a control system comprising an artificial intelligence module; and
- generating, using the injected plasma and the magnetic field, the plasma shield around the laser beam and the target area.

2. The method of claim 1, wherein the plasma is a cold plasma.

3. The method of claim 1, wherein the method comprises generating the plasma shield impermeable to gas.

4. The method of claim 1, wherein the method comprises purging a path of the laser beam of debris with a gas.

5. The method of claim 1, wherein the method comprises generating the laser beam using a fiber laser.

6. The method of claim 1, wherein the method comprises:
- generating the magnetic field using one or more electromagnets; and
- moving the one or more electromagnets to alter a location or a shape, or both, of the magnetic field.

7. The method of claim 1, wherein the plasma shield is a static plasma shield.

8. The method of claim 1, wherein the workpiece comprises or generates a flammable material.

* * * * *